Sept. 7, 1954 R. L. BARBEHENN 2,688,462
NONCORROSIVE VALVE
Filed March 2, 1951

INVENTOR
RALPH L. BARBEHENN.
BY
ATTORNEY

Patented Sept. 7, 1954

2,688,462

UNITED STATES PATENT OFFICE 2,688,462

NONCORROSIVE VALVE

Ralph L. Barbehenn, Plainfield, N. J., assignor to Johns-Manville Corporation, New York, N. Y., a corporation of New York Application March 2, 1951, Serial No. 213,571

3 Claims. (Cl. 251—225)

This invention relates to improvements in non-corrosive valves. An object is to provide a simple economical valve having all of its principal parts constructed of cylindrical non-corrosive liquid-impervious pipe segments.

A particular object is to provide a valve having all of its fluid-exposed parts constructed of hardened compressed laminated asbestos-cement pipe stock.

A further object is to provide a non-corrosive valve of design adapted for final field selection of the location of one or more outlet ports relative to the inlet port.

Other objects and advantages will appear from the detailed description that follows.

Figure 1:
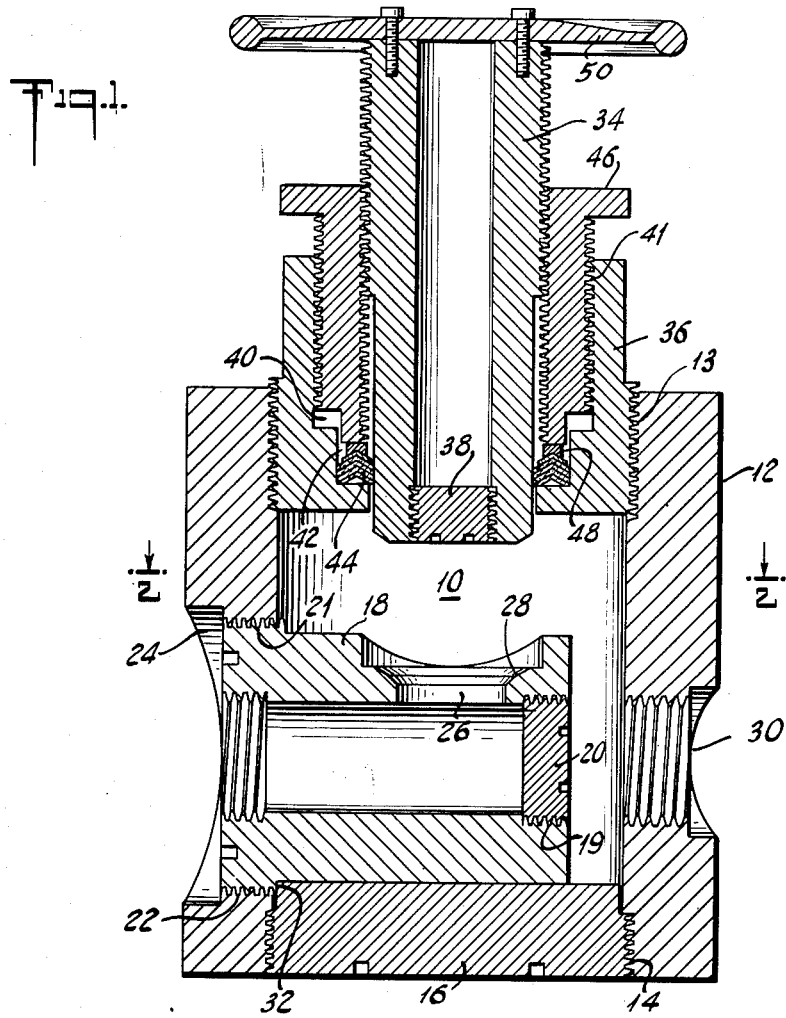
Figure 2:
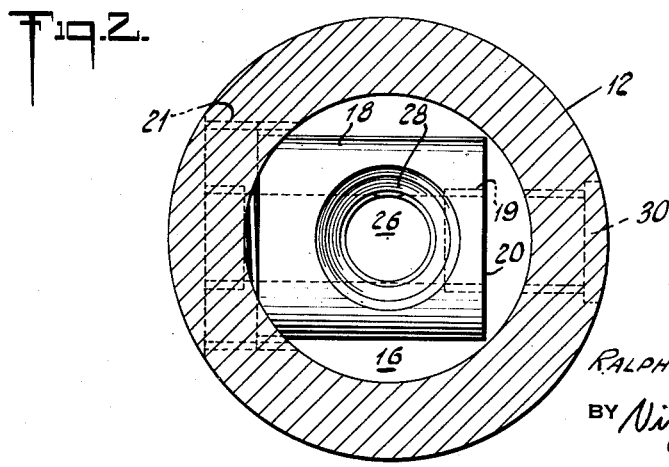

Preferred embodiments of the invention will be described in connection with the attached drawing, in which:

Fig. 1 is a view in longitudinal section taken through a valve constructed in accordance with a preferred embodiment of the invention; and Fig. 2 is a transverse sectional view of the valve taken on the plane 2—2 of Fig. 1.

In the following description the invention will be explained by way of example with reference to a preferred embodiment comprising a valve having all of its parts constructed of cylindrical hardened compressed laminated asbestos (or other reinforcing fibers) and hydraulic cement pipe stock. The valve design is simple and readily adapted to valves of both large and small sizes.

Fibro-cementitious pipe, and particularly those of hardened and compressed laminated asbestos-cement composition, have been widely recognized as particularly suitable for use in transporting corrosive liquids such as salt water and acids. It is possible to manufacture such pipe with weights and dimensions which compare favorably with cast iron, and to impart thereto the necessary structural strength and density for use in the place of cast iron pipe. Asbestos-cement valves have not been heretofore available in a form adapted for final field assembly and selection of the relative locations of inlet and outlet ports.

The conventional method of manufacturing asbestos-cement pipe of suitable strength and wall thickness for use in the construction of valves such as form the subject of the present invention, involves the steps of forming a thin web of asbestos fibers and finely pulverized Portland cement on a machine of the conventional paper mill type, wrapping the web helically upon itself on a forming mandrel to build up a web laminate of predetermined wall thickness, and subjecting the green pipe during the winding operation to strong compression to remove excess water and to densify the pipe wall. The green pipe is subsequently removed from the mandrel and cured to develop a cement hardening set.

The proportions of asbestos and cement which are used in the manufacture of pipe may vary over a considerable range. Suitable proportions include a range of 15-40 parts by weight of asbestos fibers and 60-85 parts by weight of Portland cement. To develop additional strength in the product, finely divided silica may be incorporated in the mixture to the extent of 30-100 parts to 100 parts of Portland cement. When the product incorporates silica in its composition, the pipe is cured by contact with saturated steam in an autoclave at super-atmospheric pressure of 70-150 lbs./sq. in.

Valves which are manufactured in accordance with the present invention exhibit substantial tensile and bursting strength. For example, a valve having a 10 inch pipe segment as its housing and having a wall thickness of about 0.45 inch exhibited a bursting strength of 130 lbs./sq. in. and was leakage proof under a hydrostatic head of 30 feet. Such strength was determined by standard test methods and represents ultimate strength prior to failure.

Referring to the drawings, the body of the valve comprises a cylindrical chamber 10 having a tubular housing 12 comprising a pipe segment of suitable dimensions and wall thickness, with interiorly threaded ends 13 and 14. With the housing in upright position, as portrayed in Fig. 1, an externally threaded circular disc 16 is threadably engaged with the threads 14 at the lower end of the housing, such disc serving as a closure base for the housing and valve chamber 10. A fluid intake pipe 18 projects radially into the lower part of the chamber 10, and the inner end of such intake pipe is interiorly threaded at 19 and is closed by an externally threaded circular disc plug 20. The outer end of intake pipe 18 is externally threaded at 21 to threadably engage internal threads 22 in an intake wall aperture 24 of housing 12. Intake pipe 18 extends inwardly into chamber 10 well beyond the axial center of the housing. Even though the inner end of pipe 18 may extend into line contact with the inner wall of chamber 10 opposite to aperture 24 (Fig. 2), ample fluid flow clearance space is provided around the walls and inner end of the intake pipe. An intake port 26 is provided in the upper wall of pipe 18 in a position preferably coaxial with the chamber 10 and well spaced below the upper end of chamber 10. The upper walls of intake port 26 are beveled to provide a suitably dimensioned seat 28 for the valve.

Chamber 10 may be provided with one or more outlet ports at any desired location within the valve chamber. In the valve design illustrated, a single outlet port 30 is illustrated in coaxial alignment with the bore of intake pipe 18. Outlet port 30 and the outer end of intake pipe 18 are both internally threaded to allow for threadable engagement with externally threaded ends of a fluid carrier pipeline, which is preferably constructed also of hardened compressed laminated fibro-cement pipe stock.

The inner end of the base closure plug 16 is shown as projecting into supporting contact with the lower wall of intake pipe 18, and as providing a stop shoulder 32 against which the intake pipe engageably contacts in the final valve assembly and when so engaged the seat and the valve stem are in axial alignment.

The upper end of the valve housing is sealed by a valve stem and packing gland assembly having as two of its principal elements a tubular valve stem 34 supported in coaxial relation with the seat 26 by a guide nut 36 having external threads which threadably engage the internal threads 13 of the housing. The lower end of the bore of valve stem 34 is internally threaded to receive an externally threaded plug closure 38. Also the inner end of the valve stem 34 is beveled and dimensioned to provide a tight sealing fit with the seat 28.

The upper portion of the valve stem 34 is externally threaded, and the outer portion of the guide nut 36 is provided with an enlarged bore 40 having internal threads 41. The bore of the inner end of guide nut 36 is dimensioned to provide a close clearance guide fit for the inner end of valve stem 34. The inner end of the enlarged outer bore of nut 36 is shaped to provide an annular packing gland housing 42 for a suitably dimensioned annular packing ring 44 which has been illustrated as of chevron type packing. The means for holding packing ring 44 in tight sealing engagement with the smooth inner circumferential wall of valve stem 34 within the packing gland, comprises an externally and internally threaded packing compression nut 46 inserted in threadably engaging relation with the external threads of the valve stem and with the internal threads of the guide nut. A metal follower ring 48 is inserted between the packing ring 44 and the inner end of the packing nut 46 as a means of properly transmitting and distributing the pressure applied by the packing nut 46 over the chevron-shaped conical upper surface of the packing ring 44.

It will be understood that the valve stem is advanced or retracted relative to the seat 28 by application of rotational force to the stem through the medium of a cast iron or other metal handwheel 50 having its hub detachably affixed to the outer end of the valve stem.

Adequate structural strength and liquid impermeability for the various fluid-exposed parts of the present valve are afforded only by asbestos-cement tubular stock produced as described, in the form of hardened compressed laminated pipe segments of suitable dimensions and wall thickness. Accordingly the closure plugs 16, 20 and 38 should be produced by cutting out or coring from asbestos-cement pipe walls. Because of the composition of various parts of the valve, all threads preferably comprise modified Acme threads having longer flats at the top and bottom than are used in standard Acme threads.

The design of the valve is such as to permit location of the outlet port 30 in any part of the side wall of the chamber 10 in spaced relation to the intake pipe. Drilling and threading of the outlet port may be done in the field to provide a right angle valve, an offset valve, or a multiple outlet manifold valve, as alternatives to the coaxial flow control valve illustrated. Chamber 10 should have sufficient diametric size in relation to the length of the intake pipe 18 as to provide adequate flow area space between the outlet and adjacent intake pipe walls to insure of full fluid flow capacity between the intake port and the outlet port.

With the intake pipe 18 properly installed with its peripheral shoulder 32 tightly seated against the inner end of the bottom plug 16, the valve seat 28 is strongly supported against any valve closing stresses by reason of the reinforcing effect of the plugs 16 and 20.

It will be understood that the details given are for the purpose of illustration, not restriction, and that variations within the spirit of the invention are intended to be included in the scope of the appended claims.

What I claim is:

1. A valve comprising, a tubular housing defining a chamber in its interior, a closure plug closing a first end of the housing in fluid-tight relationship therewith, said housing having first and second bores extending through its walls, said second bore serving as an outlet port for the chamber, an intake pipe mounted in said first bore in fluid-tight relationship with the housing and having its inner end extending into the chamber, means closing the inner end of said itake pipe against the passage of fluids, said intake pipe having a port extending through its side wall with a valve seat facing toward the second end of the housing, a valve stem having one end shaped to fit said valve seat complementally, means closing the second end of the housing against the passage of fluid and supporting the valve stem for adjustment longitudinally of the housing with its said one end inside the chamber and in alignment with said valve seat for cooperation therewith, said intake pipe resting on said closure plug and being supported in part thereby against displacement and having means thereon cooperating with said closure plug to align said valve seat with said one end of said valve stem in their assembled relation.

2. A valve comprising, a tubular housing defining a chamber in its interior, a closure plug closing a first end of the housing in fluid-tight relationship therewith, said housing having first and second bores extending radially through its walls, said second bore serving as an outlet port for the chamber, an intake pipe mounted in said first bore in fluid-tight relationship with the housing and having its inner end extending radially into the chamber, means closing the inner end of said intake pipe against the passage of fluids, said intake pipe having a port extending radially through its side wall and coaxially with the housing axis and providing a valve seat facing toward the second end of the housing, a valve stem having a fluid-tight end shaped to fit said valve seat complementally, means closing the second end of the housing against the passage of fluid and supporting the valve stem coaxially of the housing for adjustment axially of the housing with its said one end inside the chamber and in alignment with said valve seat for cooperation therewith, said intake pipe resting on said closure plug and being supported in part thereby against displacement and having means thereon cooperating with said closure plug to position said valve seat in axial alignment with said fluid-tight end of said valve stem in their assembled relation.

3. A valve having all fluid-exposed parts composed of hardened compressed laminated asbestos-cement pipe stock comprising, a tubular housing defining a chamber in its interior, a closure plug in threaded engagement with and closing a first end of the housing, a valve stem having a fluid-tight end, means threadably coupling the valve stem to the second end of the housing and closing it against the passage of fluid and supporting the valve stem coaxially of the housing for axial adjustment with its said fluid-tight end inside the chamber, said housing having first and second bores extending radially through its walls, said second bore serving as an outlet port for the chamber, an intake pipe having an inner end and a plug closing said inner end, means threadably connecting said itake pipe to the housing in said first bore with its inner end extending radially into the chamber, said intake pipe having a port extending radially through its side wall and coaxially with the axis of the housing to provide a valve seat facing toward and in alignment with said fluid-tight end of the valve stem, said valve seat being shaped to conform to the shape of the fluid-tight end of the valve stem, said intake pipe resting on said closure plug and being supported in part thereby against displacement and having a shoulder abutting the periphery of said closure plug adjacent the inner end thereof when said valve seat and valve stem are in axial alignment.

References Cited in the file of this patent

UNITED STATES PATENTS

| Number | Name | Date |
|---|---|---|
| 632,860 | Wilkinson | Sept. 12, 1899 |
| 930,135 | Blessing | Aug. 3, 1909 |
| 1,235,150 | Murray | July 31, 1917 |
| 1,742,319 | Porter | Jan. 7, 1930 |
| 1,851,016 | Skelly | Mar. 29, 1932 |
| 1,872,632 | Brindley | Aug. 16, 1932 |
| 2,496,176 | Powers | Jan. 31, 1950 |